(12) United States Patent
Kitamura et al.

(10) Patent No.: US 8,587,177 B2
(45) Date of Patent: Nov. 19, 2013

(54) STATOR AND METHOD OF MANUFACTURING UNIT COIL TO BE USED THEREIN

(75) Inventors: Manabu Kitamura, Miyoshi (JP); Atsushi Watanabe, Toyota (JP); Fujio Ando, Nagoya (JP); Masayoshi Haga, Nagoya (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 355 days.

(21) Appl. No.: 13/131,245

(22) PCT Filed: Jun. 11, 2010

(86) PCT No.: PCT/JP2010/059943
§ 371 (c)(1),
(2), (4) Date: May 25, 2011

(87) PCT Pub. No.: WO2011/155061
PCT Pub. Date: Dec. 15, 2011

(65) Prior Publication Data
US 2012/0007460 A1 Jan. 12, 2012

(51) Int. Cl.
*H02K 3/28* (2006.01)
(52) U.S. Cl.
USPC .............................. 310/195; 310/179; 310/198
(58) Field of Classification Search
USPC ......... 310/179, 180, 189, 195, 198, 200–203, 310/206–208
See application file for complete search history.

(56) References Cited

U.S. PATENT DOCUMENTS

| 5,331,244 | A * | 7/1994 | Rabe | 310/180 |
| 6,555,942 | B1 * | 4/2003 | Hsu | 310/208 |
| 6,791,227 | B2 * | 9/2004 | Yasuhara et al. | 310/201 |

(Continued)

FOREIGN PATENT DOCUMENTS

| JP | 3756516 B2 | 1/2006 |
| JP | 2008-099441 A | 4/2008 |

(Continued)

OTHER PUBLICATIONS

International Search Report of PCT/JP2010/059943 issued Jul. 13, 2010.

*Primary Examiner* — Tran Nguyen
*Assistant Examiner* — Naishadh Desai
(74) *Attorney, Agent, or Firm* — Kenyon & Kenyon LLP

(57) ABSTRACT

A stator includes a stator core and a distributed winding type multi-phase coil. This coil includes unit coils made by winding a flat conductor wire in plural turns. The unit coils are mounted in slots of the stator core and connected with each other. Each unit coil includes an outer-layer coil and an inner-layer coil each being concentrically wound. Those two layer coils are made of a single continuous flat conductor wire. A winding start portion of the outer-layer coil and a winding end portion of the inner-layer coil form first and second connection end portions of the unit coil respectively. The first and second connection end portions are located separately on both edges of the unit coil above an upper end face of the stator core. The first connection end portion is placed close to an inner circumference of the stator core and the second connection end portion is placed close to an outer circumference of the stator core. The first connection end portions of the adjacent unit coils constituting the same phase are connected with each other. The second connection end portions of the adjacent unit coils constituting the same phase are connected with each other.

6 Claims, 18 Drawing Sheets

(56) References Cited

U.S. PATENT DOCUMENTS

| | | | |
|---|---|---|---|
| 7,265,472 B2 * | 9/2007 | Mitcham | 310/201 |
| 2004/0017125 A1 * | 1/2004 | Nakamura et al. | 310/201 |
| 2008/0116755 A1 * | 5/2008 | Sahara et al. | 310/71 |

FOREIGN PATENT DOCUMENTS

| | | |
|---|---|---|
| JP | 2008-104293 A | 5/2008 |
| JP | 2008-125212 A | 5/2008 |
| JP | 2010-067790 U | 3/2010 |

* cited by examiner

STATOR AND METHOD OF MANUFACTURING UNIT COIL TO BE USED THEREIN

CROSS-REFERENCE TO RELATED APPLICATIONS

This is a 371 national phase application of PCT/JP2010/059943 filed on Jun. 11, 2010, the entire content of which is incorporated herein by reference.

FIELD OF THE INVENTION

The present invention relates to a stator including a stator core and a multi-phase coil of a distributed winding type mounted in the stator core, the multi-phase coil consisting of a plurality of unit coils each being formed of a flat conductor wire wound in plural turns, and a method of manufacturing the unit coil to be used in the stator.

BACKGROUND OF THE INVENTION

In recent years, the needs for hybrid electric vehicles, electric vehicles, and others have been increased. Accordingly, motors have been studied to be used for the driving power of vehicles. Such motors to be mounted in the vehicles are demanded for high power and downsizing. Particularly, hybrid electric vehicles are strictly demanded for size reduction in view of the placement of a motor in an engine room. Therefore, various studies have been made to achieve downsizing and high power of motors.

For instance, Patent Literature 1 listed below discloses a stator including a plurality of unit coils each of which is formed of a rectangular conductor wire (a flat conductor wire) wound in plural turns. The unit coils are mounted in slots of the stator core and connected in respective phases to constitute the distributed winding type multi-phase coil. Each unit coil includes a straight (or linear) portion to be inserted in a slot of the stator core and coil end portions to be placed on end faces of the stator core. On each coil end portion, each unit coil is formed with a crank-shaped portion including no twisting. Each unit coil is mounted in the stator core in a concentrically wound form by striding over slots for different phases.

As disclosed in Patent Literature 1, the pattern of the multi-phase coil of the stator includes a concentrated winding type and a distributed winding type. The concentrated winding type is achieved by winding a coil (a wire) in concentrating manner on each teeth portion of the stator core. The distributed winding type is achieved by winding a plurality of unit coils each striding over some slots of the stator core so that the unit coils of the different phase or the same phase overlap one on another on each coil end. The stator including the concentrated winding type multi-phase coil could reduce the size of the coil ends. This configuration is effective in downsizing and improvement in efficiency of a motor. The stator core including the distributed winding type multi-phase coil could make a rotating magnetic field inside the stator approximate to a sine wave. This realizes power and lower noise than the concentrated winding type. Both types adopt the flat conductor wire as a coil wire to enhance a coil space factor of the slot, thereby achieving high power of the motor.

On the other hand, Patent Literature 2 listed below discloses a stator constituted of a multi-phase coil wound on a stator core in a single-phase concentrically winding manner. The multi-phase coil includes a first U-phase coil, a second U-phase coil, a first V-phase coil, a second V-phase coil, a first W-phase coil, and a second W-phase coil, which are unit coils respectively. The first U-phase coil is made by winding a first wire coil, a second wire coil, and a third wire coil in a single-phase concentrically winding manner. A winding end portion of the first wire coil is connected with a winding start portion of the second wire coil, a winding end portion of the second wire coil is connected with a winding start portion of a third wire coil. That is, the first U-phase coil consists of the concentrically wound wire coils arranged in three layers to form a single unit coil. A winding start portion of the first wire coil and a winding end portion of the third wire coil are used as a pair of connection end portions to be connected respectively to a second U-phase coil. The second U-phase coil, the first V-phase coil, the second V-phase coil, the first W-phase coil, and the second W-phase coil are configured in the same manner as above.

CITATION LIST

Patent Literature

Patent Literature 1: JP 2008-104293A
Patent Literature 2: JP 2008-099441A

SUMMARY OF INVENTION

Technical Problem

It is conceivable that the unit coils in Patent Literature 1 are configured in a multiple layer concentrically winding manner as disclosed in Patent Literature 2. However, in such a case, the winding start portion and the winding end portion of each layer coil have to be connected with each other. This needs a troublesome connecting work. Further, due to the existence of many connecting portions as mentioned above, the coil ends of the stator take up much space, which hold back downsizing of the stator.

The present invention has been made to solve the above problems and has a purpose to provide a stator capable of making a connecting work of unit coils simple to constitute a multi-phase coil and achieving a reduction in space of coil ends, and a method of manufacturing a unit coil to be used in the stator.

Solution to Problem (1) To achieve the above purpose, a first aspect of the invention provides a stator comprising: a stator core having a plurality of slots; and a multi-phase coil of a distributed type provided in the stator core, the multi-phase coil including a plurality of unit coils, each unit coil being made of a flat conductor wire wound in plural turns, and the unit coils being mounted in the slots of the stator core, wherein each unit coil includes a plurality of concentrically wound layer coils, each layer coil being made of a single continuous flat conductor wire, the layer coils of each unit coil include an outermost layer coil and an innermost layer coil, and a winding start portion or a winding end portion of the outermost layer coil and a winding end portion or a winding start portion of the innermost layer coil form a first connection end portion and a second connection end portion of the unit coil, the first connection end portion and the second connection end portion are located separately at two edges of the unit coil in an axial direction thereof, and of the unit coils, the first connection end portions of adjacent unit coils constituting the same phase are connected with each other and the second connection end portions of the adjacent unit coils constituting the same phase are connected with each other.

According, to the configuration (1), the distributed winding type multi-phase coil consisting of different-phase coils, e.g., a U-phase coil, a V-phase coil, and a W-phase coil. Each phase coil consists of the plurality of unit coils connected in series with each other. Herein, above the stator core, the first connection end portions of the adjacent unit coils are connected with each other and the second connection end portions are connected with each other. Accordingly, unlike a stator using conventional unit coils, the plurality of layer coils constituting the same unit coil do not have to be connected with each other.

(2) To achieve the above-mentioned object, preferably, in the above configuration (1), both the first connection end portion and the second connection end portion of each unit coil are located above one end face of the stator core in an axial direction thereof, one of the first connection end portion and the second connection end portion is located in a position close to an inner circumference of the stator core and the other is located in a position close to an outer circumference of the stator core.

According to the configuration (2), in addition to the operation of the configuration (1), a connecting portion of the first connection end portions of adjacent unit coils constituting the same phase and a connecting portion of the second connection end portions of adjacent unit coils constituting the same phase are located separately in the positions close to the inner circumference of the stator core and the positions close to the outer circumference of the stator core.

(3) To achieve the above-mentioned object, a second aspect of the invention provides a stator comprising: a stator core having a plurality of slots; and a multi-phase coil of a distributed type provided in the stator core, the multi-phase coil including a plurality of unit coils, each unit coil being made of a flat conductor wire wound in plural turns, and the unit coils being mounted in the slots of the stator core, wherein each unit coil includes a plurality of concentrically wound layer coils, each layer coil being made of a single continuous flat conductor wire, the layer coils of each unit coil include an outermost layer coil and an innermost layer coil, and a winding start portion or a winding end portion of the outermost layer coil and a winding end portion or a winding start portion of the innermost layer coil form a first connection end portion and a second connection end portion of the unit coil, the first connection end portion and the second connection end portion are both located in one of two edges of the unit coil in an axial direction thereof, and of the unit coils, the first connection end portions of adjacent unit coils constituting the same phase are connected with each other and the second connection end portions of the adjacent unit coils constituting the same phase are connected with each other.

According to the configuration (3), the distributed winding type multi-phase coil consists of different-phase coils, e.g., a U-phase coil, a V-phase coil, and a W-phase coil. Each phase coil consists of the plurality of unit coils connected in series with each other. In this configuration, above the stator core, the first connection end portions of the adjacent unit coils are connected with each other and the second connection end portions are connected with each other. Consequently, unlike the stator using the conventional unit coils, the plurality of layer coils constituting the same unit coil do not have to be connected with each other.

(4) To achieve the above-mentioned object, preferably, in the above-mentioned configuration (3), both the first connection end portion and the second connection end portion of each unit coil are located above one end face of the stator core in an axial direction thereof, both the first connection end portion and the second connection end portion are located in positions close to an inner circumference or an outer circumference of the stator core.

According to the configuration (4), in addition to the operation of the configuration (3), a connecting portion of the first connection end portion of the adjacent unit coils constituting the same phase and a connecting portion of the second connection end portion are both located on the same side close to the inner or outer circumference of the stator core.

(5) To achieve the above object, a third aspect of the invention provides a method of manufacturing a unit coil to be used in the stator set forth in claim 1, the unit coil including a plurality of concentrically wound layer coils, the method comprising: a winding step using a winding die of an almost rectangular columnar shape having at least a stepped portion on an outer periphery, the winding die including a plurality of winding bodies that have sequentially different sizes in an axial direction being continuously formed on both sides of the stepped portion, the winding step including winding a single flat conductor wire spirally on an outer periphery of each winding body from one end toward the other end of the winding die and forming a bridge portion extended from the flat conductor wire on the outer periphery of the stepped portion; a die release step of taking out the wound flat conductor wire from the winding die; and a moving step of relatively moving a small coil part wound on a small winding body of the winding bodies into the inside of a large coil part wound on a large winding body of the winding bodies by plastic-deforming the bridge portion.

According to the configuration (5), a plurality of layer coils can be easily made of a single continuous flat conductor wire in a concentrically winding manner.

(6) To achieve the above object, a fourth aspect of the invention provides a method of manufacturing a unit coil to be used in a stator core having the above configuration (3), the unit coil including two concentrically wound layer coils, the method comprising: an inner-layer winding step of winding a single flat conductor wire spirally on an outer periphery of an inner-layer winding die of an almost rectangular columnar shape, from one end toward the other end, to form an inner-layer coil; an outer-layer winding die moving step of moving an outer-layer winding die of an almost rectangular cylindrical shape into the outside of the inner-layer coil; an outer-layer winding step of winding the flat conductor wire spirally on an outer periphery of the outer-layer winding die from one end toward the other end in an opposite direction to a forward winding direction of the inner-layer coil, through a bridge portion extended from a winding end portion of the inner-layer coil, to form an outer-layer coil; and a die release step of taking out the inner-layer coil and outer-layer coil from the inner-layer winding die and the outer-layer winding die.

According to the configuration (6), an outer-layer coil and an inner-layer coil can be easily made of a single continuous flat conductor wire in concentrically winding manner.

Advantageous Effects of Invention

According to the configurations (1) to (4) mentioned above, it is possible to simplify a connecting work of unit coils to constitute a multi-phase coil and reduce the space of a coil end of a stator.

According to the configurations (5) and (6) mentioned above, a unit coil including at least an outer-layer coil and an inner-layer coil can be easily manufactured by use of a single flat conductor wire.

DETAILED DESCRIPTION

First Embodiment

A detailed description of a first preferred embodiment of a stator and a manufacturing method of a unit coil to be used therein embodying the present invention will now be given referring to the accompanying drawings.

Figure 1:
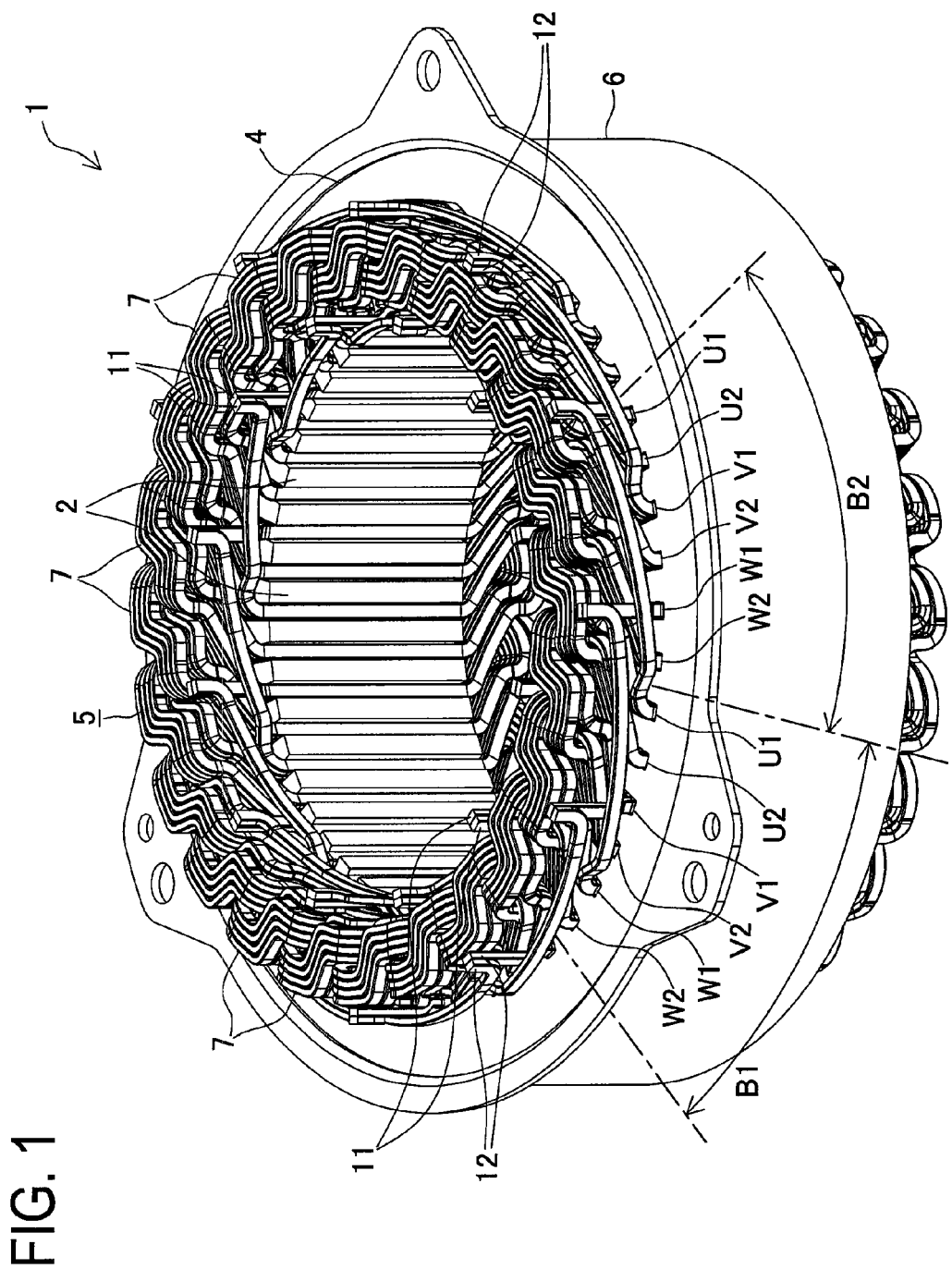
FIG. 1 is a perspective view of a stator in a first embodiment.

FIG. 1 is a perspective view of a stator 1 in this embodiment. This stator 1 will be used in a three-phase motor having a U-phase, a V-phase, and a W-phase. The stator 1 includes a stator core 4 having a plurality of teeth portions 2 (see FIGS. 6 to 8) and a plurality of slots 3 (see FIGS. 6 to 8), a multi-phase coil 5 of a distributed winding type mounted in the stator core 4, and an outer ring 6 attached on the outer periphery of the stator core 4. The multi-phase coil 5 includes a plurality (twenty-four in this embodiment) of unit coils 7. The unit coils 7 are set in the slots 3 of the stator core 4 respectively and connected with each other. The stator core 4 in this embodiment is a split type core consisting of a plurality of pieces 17 (see FIG. 6) connected in an annular form as mentioned later. In FIG. 1, the stator core 4 is illustrated as a single-piece form for convenience.

In this embodiment, the multi-phase coil 5 is composed of a U-phase coil for the U phase, a V-phase coil for the V phase, and a W-phase coil for the W phase. Each of the phase coil consists of eight unit coils 7. The unit coils 7 constituting each phase coil are mounted in the slots 3 of the stator core 4 in a concentric winding pattern by striding over different-phase slots 3 in which different phase coils are mounted.

Figure 2:
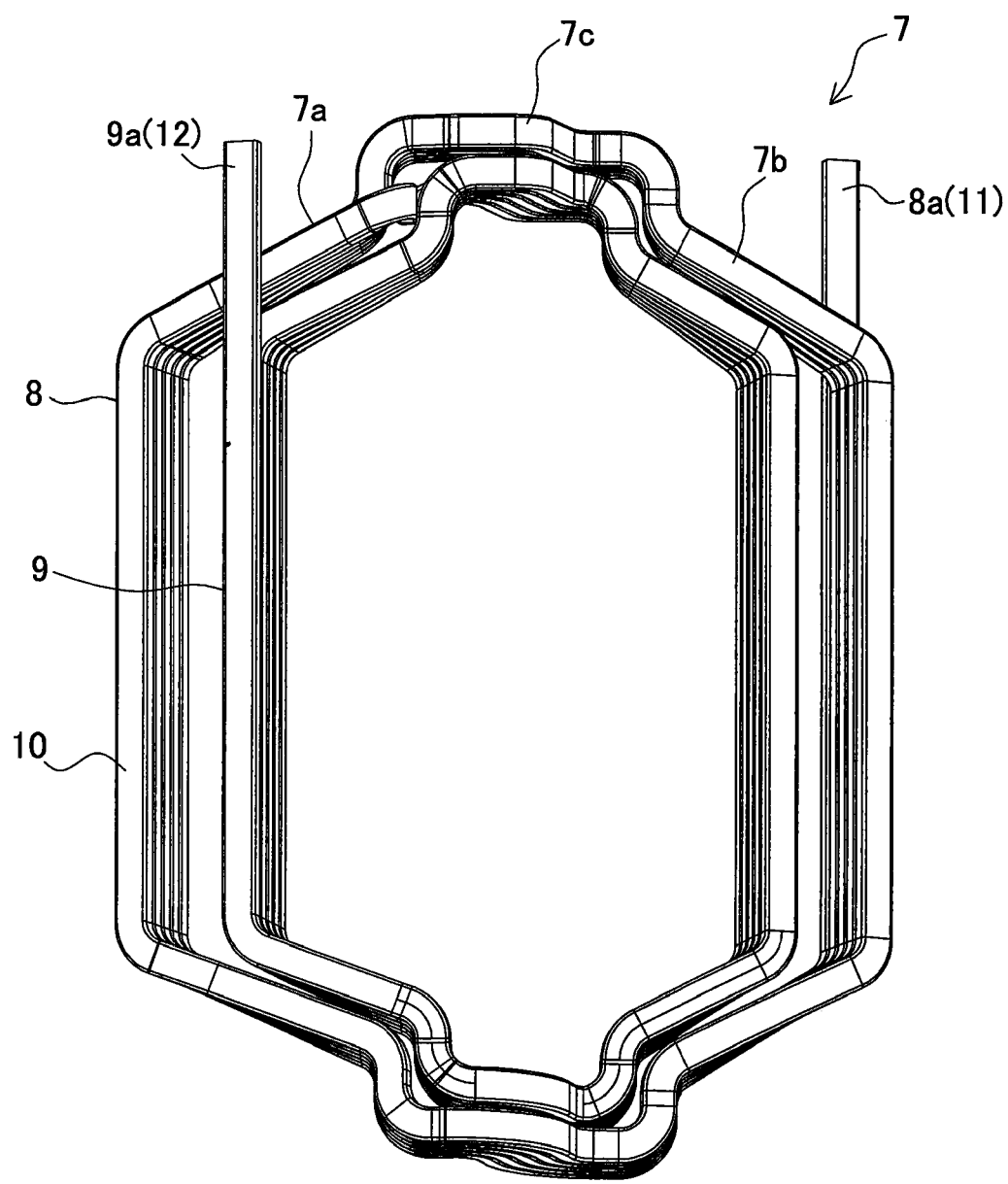
FIG. 2 is a perspective front view of a unit coil in the first embodiment.
Figure 3:
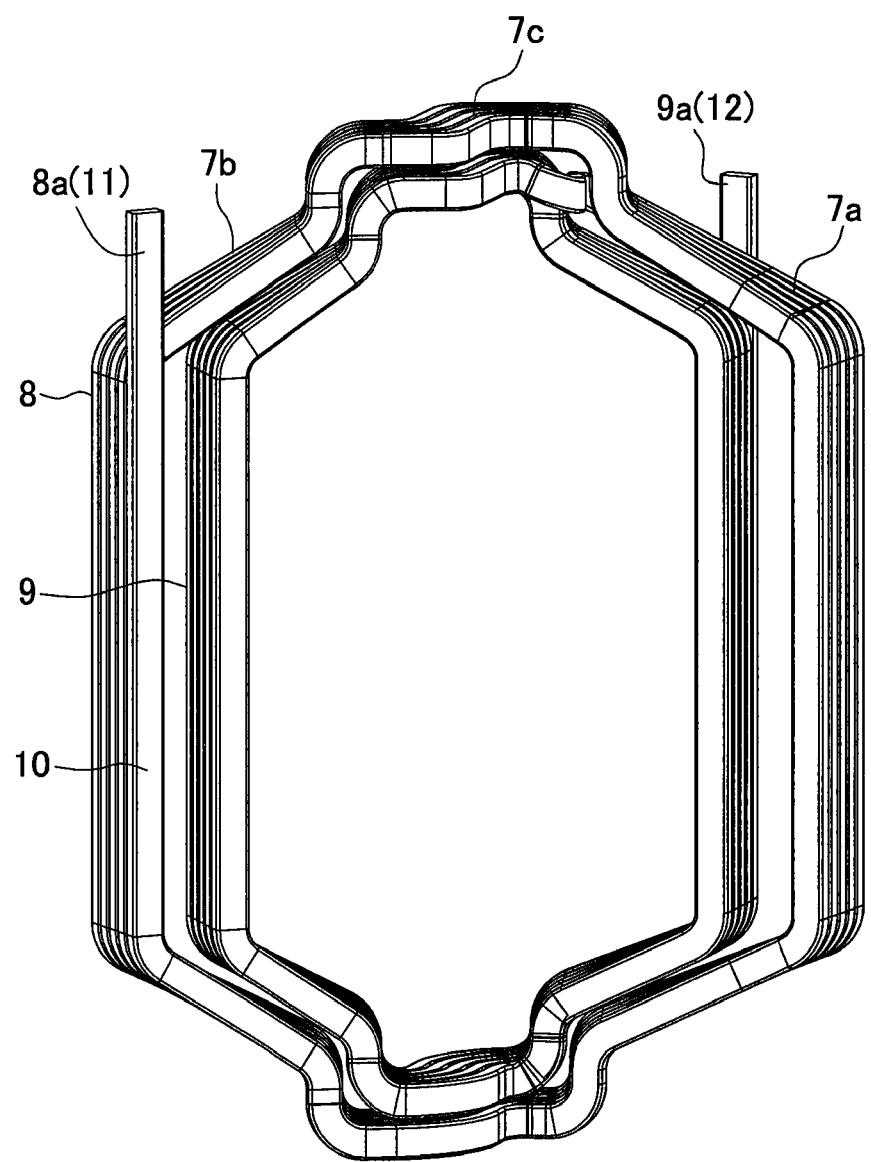
FIG. 3 is a perspective back view of the unit coil in the first embodiment.
Figure 4:
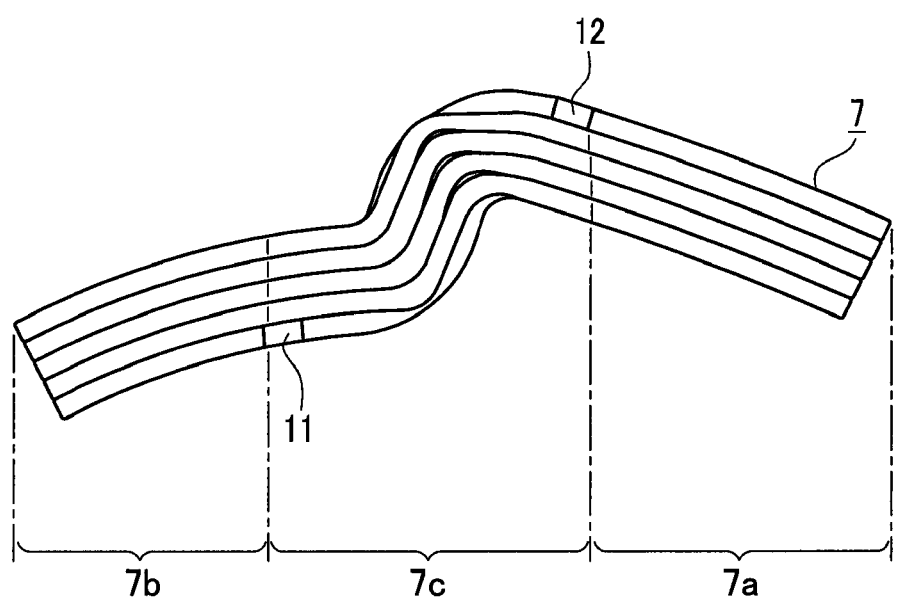
FIG. 4 is a plan view of the unit coil in the first embodiment.

FIG. 2 is a perspective front view of one of the unit coils 7. FIG. 3 is a perspective back view of this unit coil 7. FIG. 4 is a plan view of this unit coil 7 seen from above in FIG. 3. Each unit coil 7 has an almost hexagonal shape in whole, including an outer-layer coil 8 and an inner-layer coil 9 which are concentrically wound. These outer-layer coil 8 and inner-layer coil 9 are formed by winding a single continuous flat conductor wire 10 in plural turns. In the present embodiment, a winding start portion 8a of the outer-layer coil 8 and a winding end portion 9a of the inner-layer coil 9 form a pair of a first connection end portion 11 and a second connection end portion 12 of each unit coil 7. The first connection end portion 11 and the second connection end portion 12 are arranged separately on both sides of the unit coil 7 in an axial direction thereof (in a front and back direction relative to drawing sheets of FIGS. 2 and 3). Specifically, the first connection end portion 11 is placed on a back side of the unit coil 7 as shown in FIGS. 2 and 3. The second connection end portion 12 is placed on a front side of the unit coil 7 as shown in FIGS. 2 and 3.

The unit coil 7 configured as above has an almost S-shaped bent form in plan view as shown in FIG. 4. Herein, the unit coil 7 includes three sections as shown in FIG. 4, i.e., an outer circumferential portion 7a placed on a side close to an outer circumference of the stator core 4, an inner circumferential portion 7b placed on the other side close to an inner circumference of the stator core 4, and an intermediate portion 7c placed between the positions close to the inner circumference and the outer circumference of the stator core 4.

The flat conductor wire 10 used for each unit coil 7 is produced by coating a metal wire having a rectangular cross section with insulating resin. The metal wire is made of high conductive metal such as copper. The insulating resin is a resin having a high insulating property such as enamel and PPS.

To manufacture the stator 1, a cage-shaped coil ("cage coil") 16 (see FIG. 6) in which a plurality of the unit coils 7 are assembled to overlap one another into an annular cage form. Then, the split type stator core 4 is attached to the cage coil 16.

Figure 5:
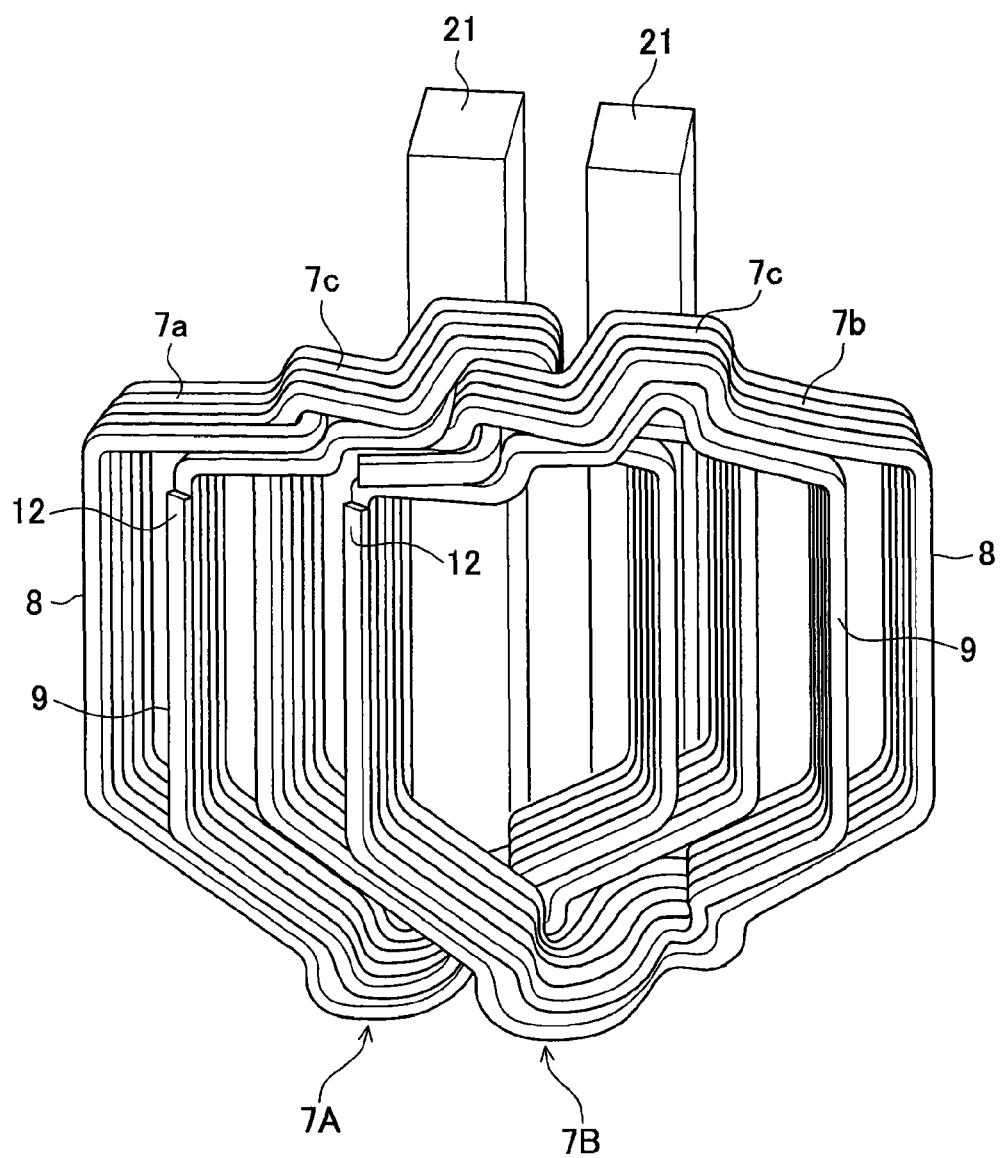
FIG. 5 is a perspective view of two stacked or overlapped unit coils in the first embodiment.
Figure 6:
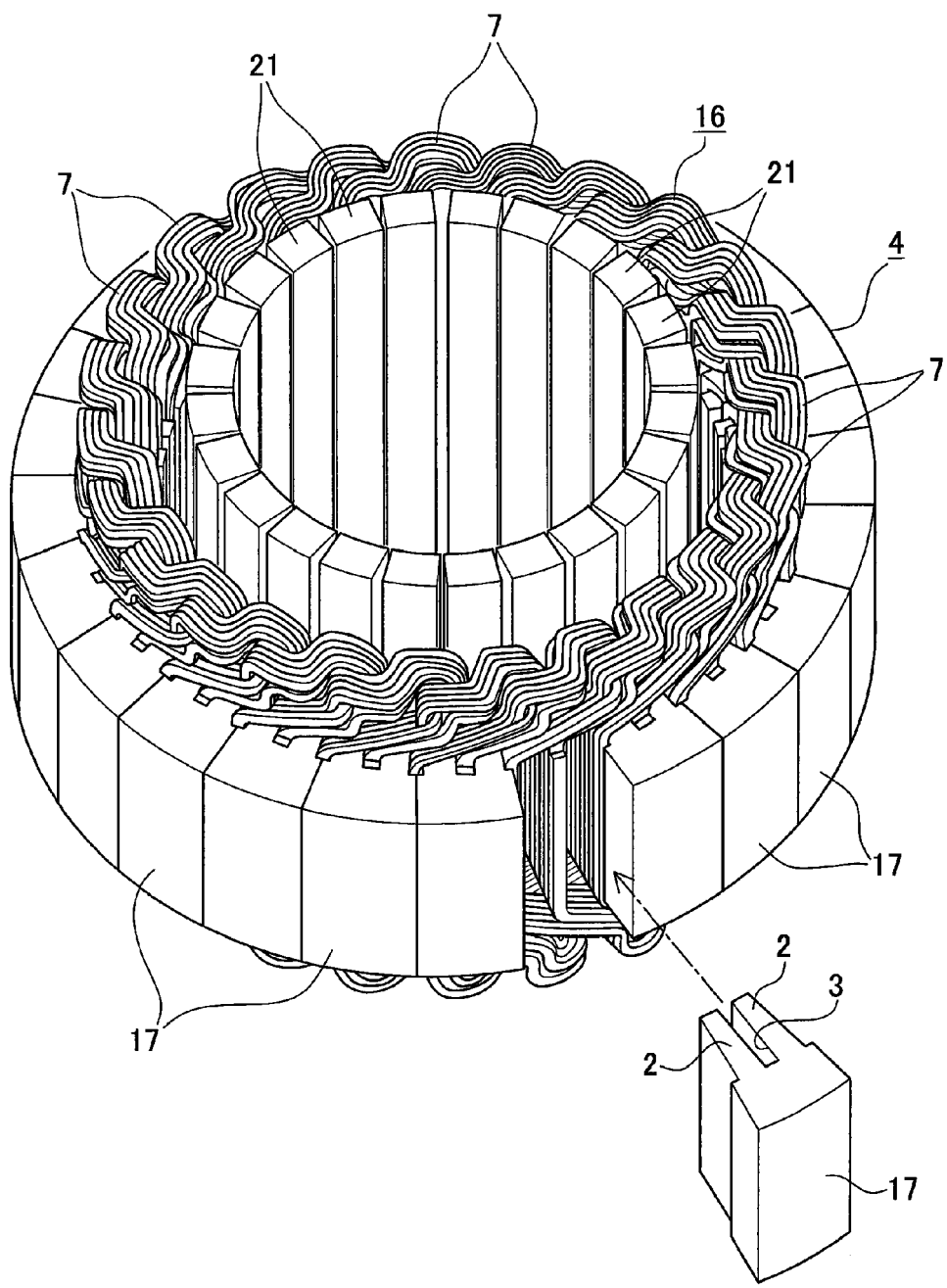
FIG. 6 is a schematic perspective view showing a state where a piece of a split stator core is to be inserted into a coil cage in the first embodiment.

FIG. 5 is a perspective view of two unit coils 7A and 7B overlapping one on the other in the course of manufacturing the cage coil 16 (see FIG. 6). In FIG. 5, positioning jigs 21 are placed behind the two unit coils 7A and 7B to position each unit coil 7A, 7B in place. In FIG. 5, the two unit coils 7A and 7B having the same shape are arranged so that respective intermediate portions 7c are located adjacently. In FIG. 5, an inner circumferential portion 7b of the first unit coil 7A is placed under an intermediate portion 7c of the second unit coil 7B. Further, an outer circumferential portion 7a of the second unit coil 7B is placed under an intermediate portion 7c of the first unit coil 7A.

FIG. 6 is a schematic perspective view showing a state where one piece 17 constituting the split stator core 4 is to be inserted into the cage coil 16. The cage coil 16 is produced by overlapping twenty-four unit coils 7 one on another as shown in FIG. 5. The stator core 4 is assembled into an annular form by inserting each piece 17 into hollow spaces of the cage coil 16 from outside. As shown in FIG. 6, each piece 17 includes two teeth portions 2 and one slot 3 between these teeth portions 2. The pieces 17 are assembled so that their teeth portions 2 are inserted into the hollow spaces of the unit coils 7 constituting the cage coil 16. Then, the outer ring 6 is shrink-fitted on the outer periphery of the stator core 4 as shown in FIG. 1. Further, eight unit coils 7 constituting each of the U-phase coil, the V-phase coil, and W-phase coil are connected in series with each other through the connection end portions 11 and 12. As above, the stator 1 shown in FIG. 1 is finally completed.

As shown in FIG. 1, in the stator 1, both the first connection end portion 11 and the second connection end portion 12 of each unit coil 7 are placed above an upper end face of the stator core 4 in an axial direction thereof. The second connection end portion 12 of the inner-layer coil 9 is located in a position close to the outer circumference of the stator core 4 and the first connection end portion 11 of the outer-layer coil 8 is located in a position close to the inner circumference of the stator core 4. Of the unit coils 7, the second connection end portions 12 of the adjacent unit coils 7 constituting a certain phase coil (for example, the "U-phase coil") are connected with each other in the position close to the outer circumference of the stator core 4. Similarly, the first connection end portions 11 of the adjacent unit coils 7 constituting the certain phase coil (for example, the "U-phase coil") are connected with each other in the position close to the inner circumference of the stator core 4.

Figure 7:
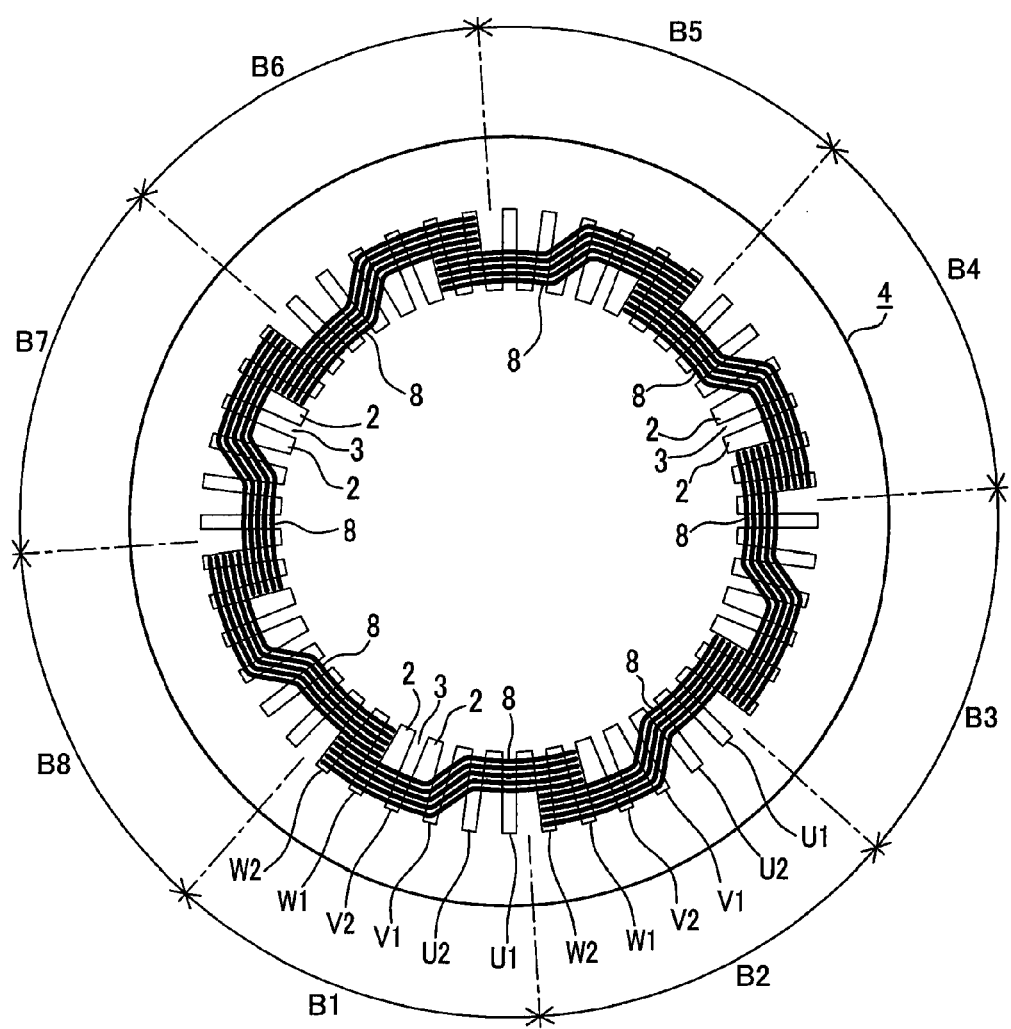
FIG. 7 is a schematic plan view showing arrangement of only outer-layer coils of eight unit coils constituting a W-phase coil in a stator core in the first embodiment.
Figure 8:
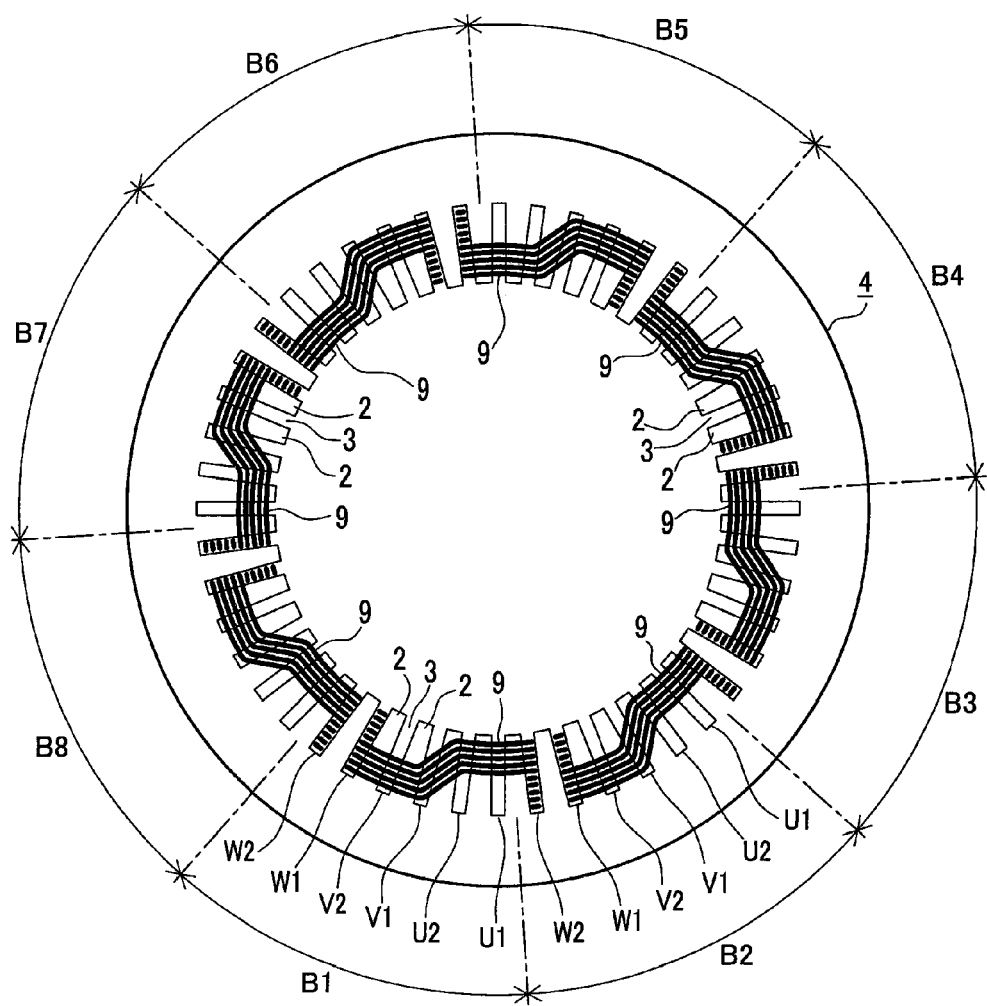
FIG. 8 is a schematic plan view showing arrangement of only inner-layer coils of eight unit coils constituting the W-phase coil in the stator core in the first embodiment.

FIG. 7 is a plan view schematically showing arrangement of only the outer-layer coils 8 of eight unit coils 7 constituting the W-phase coil of the stator core 4. FIG. 8 is a plan view schematically showing arrangement of only the inner-layer coils 9 of the eight unit coils 7 constituting the W-phase coil of the stator core 4. In FIGS. 7 and 8, the stator core 4 is illustrated as a single-piece form for convenience.

As shown in FIGS. 7 and 8, the stator core 4 is divided into first to eighth blocks B1, B2, B3, B4, B5, B6, B7, and B8. Each of the blocks B1 to B8 includes a set of six slots 3 to be used for the U-phase coil, the V-phase coil, or the W-phase coil. For instance, the first block B1 includes a set of two slots 3 for two U phases U1 and U2, two slots 3 for two V phases V1 and V2, and two slots 3 for two W phases W1 and W2. Other blocks B2 to B8 are configured in the same way.

As shown in FIG. 7, for instance, a part of the outer-layer coil 8 constituting one unit coil 7 is inserted into the slot 3 for the W phase W2 of the first block B1. Further, as shown in FIG. 7, a part of the outer-layer coil 8 constituting the adjacent other unit coil 7 is inserted into the slot 3 for the W phase W2 of the second block B2. On the other hand, as shown in FIG. 8, a part of the inner-layer coil 9 constituting one unit coil 7 is inserted into the slot 3 for the W phase W1 of the first block B1. As shown in FIG. 8, a part of the inner-layer coil 9 constituting the adjacent other unit coil 7 is inserted into the slot 3 for the W phase W1 of the second block B2.

Figure 9:
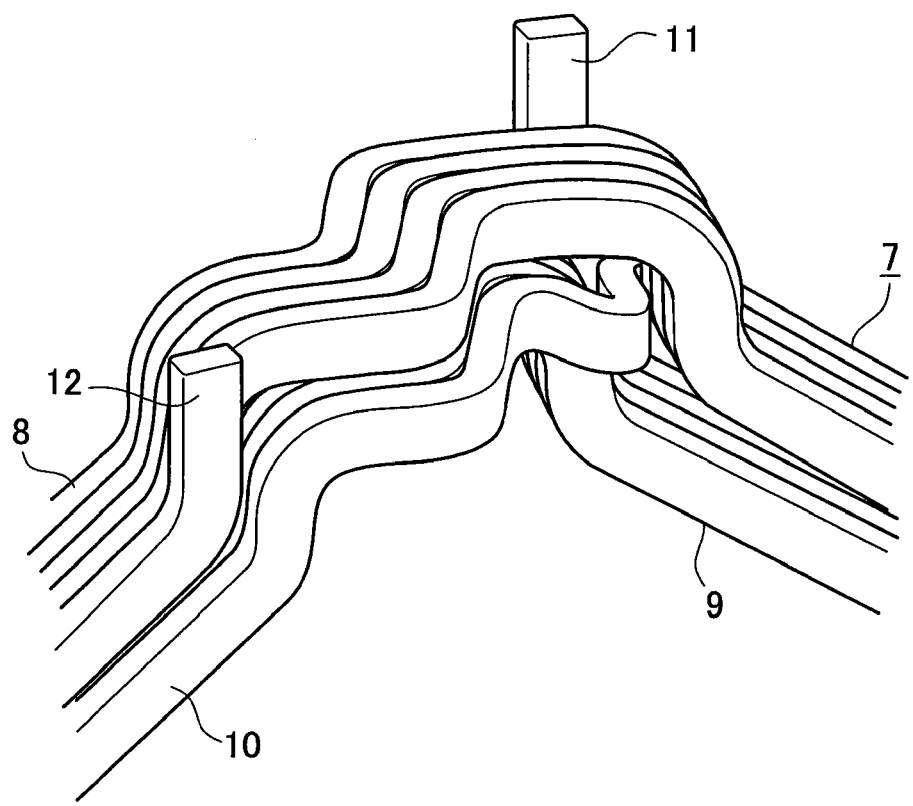
FIG. 9 is a perspective view showing a portion of the unit coil constituting a coil end in the first embodiment.
Figure 10:
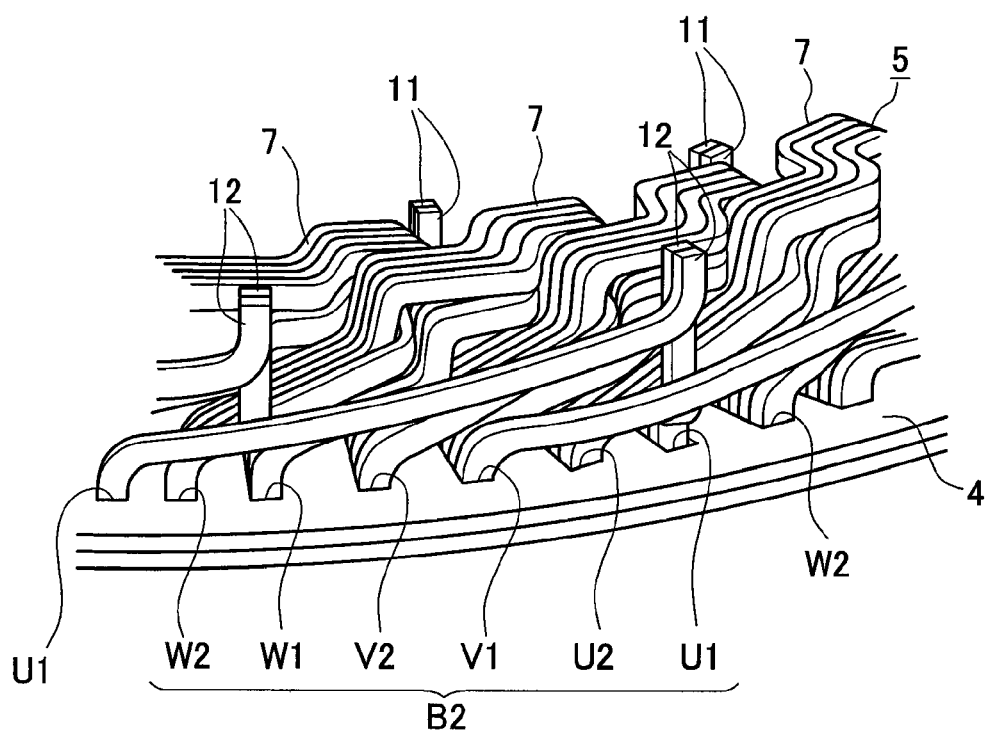
FIG. 10 is a perspective view showing a part of a coil end of the stator in the first embodiment.
Figure 10:

FIG. 9 is a perspective view of a portion of the unit coil 7 forming the coil end in the present embodiment. FIG. 10 is a perspective view of a part of the coil end of the stator 1 in the present embodiment. As shown in FIG. 9, the first connection end portion 11 and the second connection end portion 12 of each unit coil 7 are placed separately on both sides or edges of each unit coil 7. In FIG. 9, the first and second connection end portions 11 and 12 are illustrated as the same shape. However, actually, two kinds of unit coils 7 are prepared in advance in order to connect the connection end portions 11 and 12 of the adjacent unit coils 7 without using a bus bar or the like. Specifically, the unit coil 7 of one kind is designed so that the first connection end portion 11 is long and the second connection end portion 12 is short, while the unit coil 7 of the other kind is designed so that the first connection end portion 11 is short and the second connection end portion 12 is long.

Figure 11:
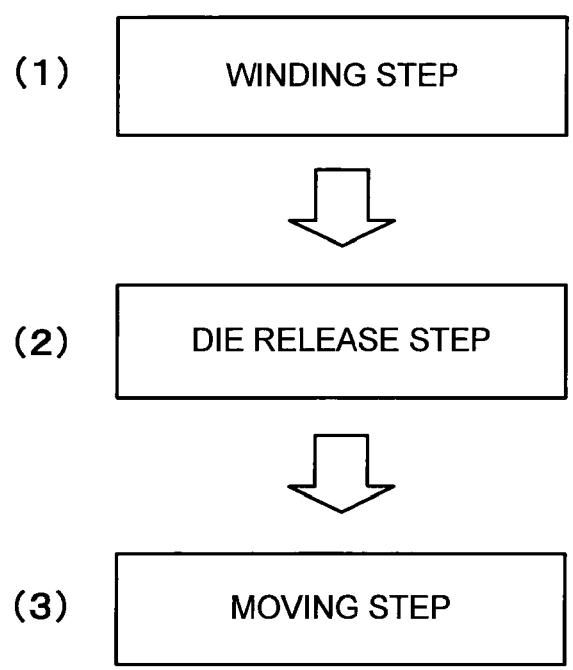
FIG. 11 is a flowchart showing a sequence of steps in a method of manufacturing a unit coil in the first embodiment.

A method of manufacturing the unit coils 7 in the present embodiment will be explained below. FIG. 11 is a flowchart showing a sequence of steps of the manufacturing method. FIGS. 12 to 15 are cross sectional views schematically showing a state in each step.

Figure 12:
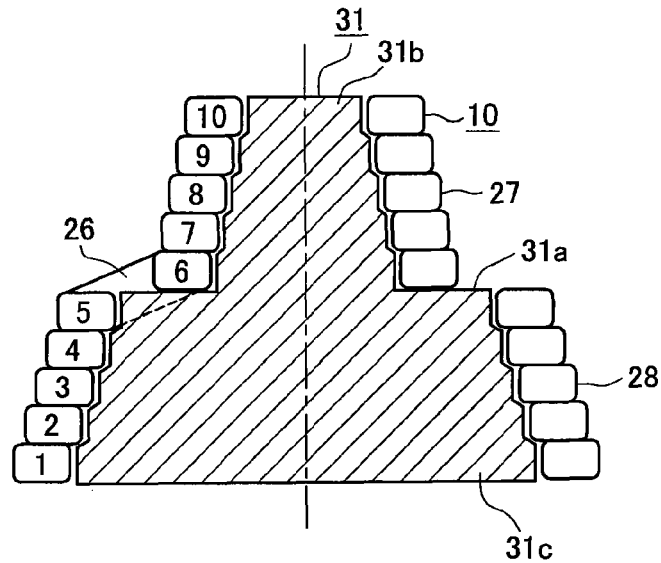
FIG. 12 is a cross sectional view schematically showing a "winding step" in the first embodiment.

In a "winding step" in (1) of FIG. 11, firstly, the flat conductor wire 10 is wound in plural turns by use of a winding die 31 as shown in FIG. 12. The winding die 31 includes a single stepped portion 31a on an outer periphery. On both sides of the stepped portion 31a as a boundary, a small-diameter winding body 31b and a large-diameter winding body 31c having sequentially different sizes in the axial direction are continuously formed in an almost rectangular columnar shape. On the outer periphery of each winding bodies 31b and 31c, a stepped surface is formed with steps each having a height conforming to the width of the flat conductor wire 10. A single flat conductor wire 10 is wound spirally around the outer periphery of each winding body 31c and 31b from a lower end of the large-diameter winding body 31c of the winding die 31 toward an upper end of the small-diameter winding body 31b. Around the stepped portion 31a, the flat conductor wire 10 is extended to form a bridge portion 26. In FIG. 12, each rectangular graphic form indicates the cross section of the flat conductor wire 10 (a hatching is omitted). The numeral labeled in each cross section represents the number of turns. The same applies to other FIGS. 13 to 15.

Figure 13:
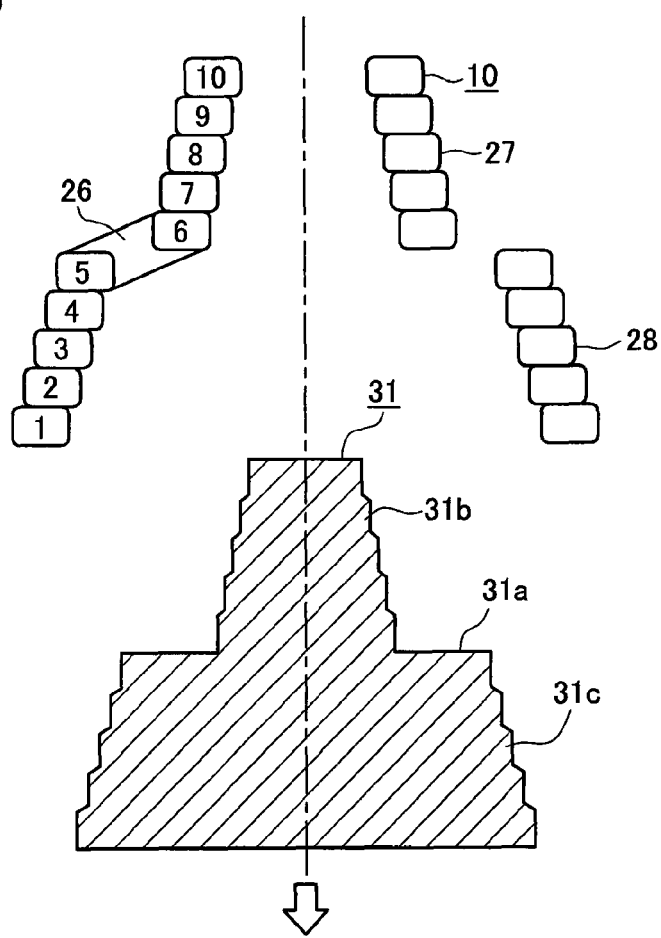
FIG. 13 is a cross sectional view schematically showing a "die release step" in the first embodiment.

In a "die release step" in (2) of FIG. 11, the flat conductor wire 10 in a wound form is taken out from the die 31 as shown in FIG. 13. In this state, the wound flat conductor wire 10 has a shape transferred from the outer shape of the die 31. In this state, a portion wound on the small-diameter winding body 31b is referred to as a small coil part 27 and a portion wound on the large-diameter winding body 31c is referred to as a large coil part 28.

Figure 14:
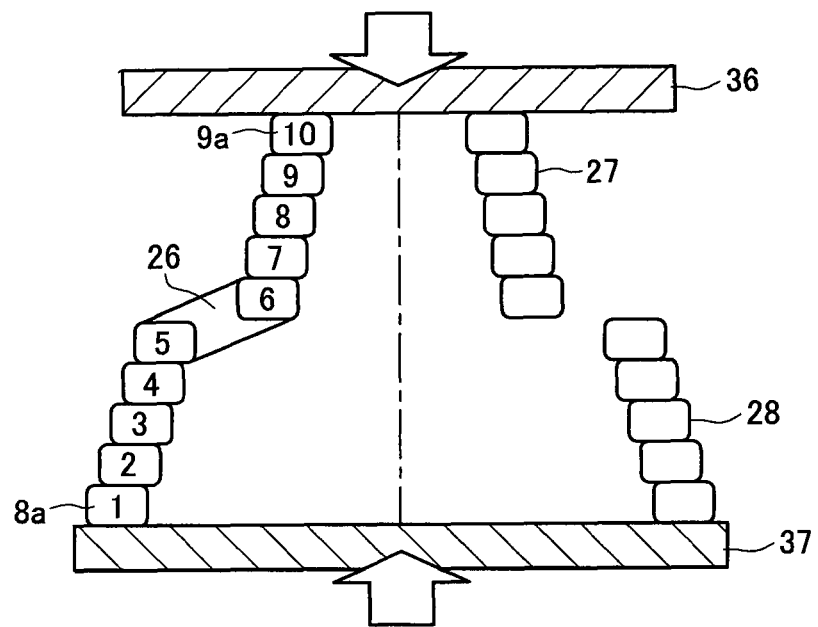
FIG. 14 is a cross sectional view schematically showing a "moving step" in the first embodiment.
Figure 15:
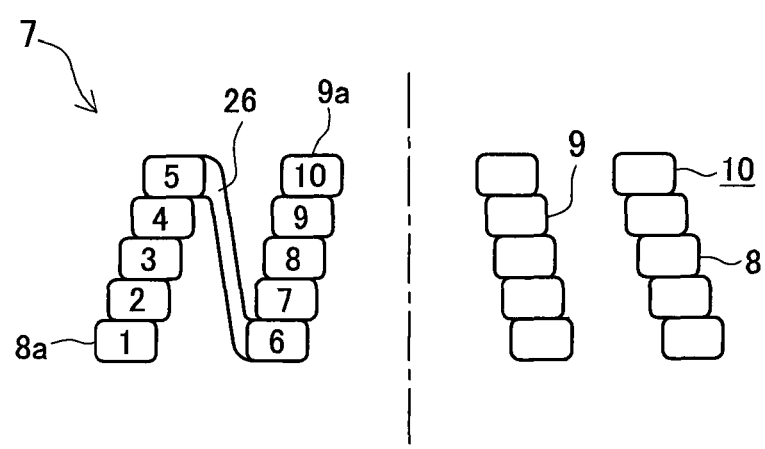
FIG. 15 is a cross sectional view schematically showing the "moving step" in the first embodiment.

In a "moving step" in (3) of FIG. 11, the bridge portion 26 is plastically deformed to relatively move the small coil part 27 into the inside of the large coil part 28 as shown in FIGS. 14 and 15. In the present embodiment, as shown in FIG. 14, the small coil part 27 and the large coil part 28 are compressed by a pair of compression plates 36 and 37 to move relatively the coil parts 27 and 28.

Through the above steps, the unit coil 7 including the outer-layer coil 8 and the inner-layer coil 9 in a concentric winding configuration is manufactured as shown in FIG. 15. In FIG. 15, the winding start portion 8a of the outer-layer coil 8 is located as indicated by "1" on one side or edge of the unit coil 7 in the axial direction and the winding end portion 9a of the inner-layer coil 9 is located on the other side edge of the unit coil 7 in the axial direction as indicated by "10". Those winding start portion 8a and winding end portion 9a form the pair of connection end portions 11 and 12 of one unit coil 7. Herein, even though the details are not shown in FIGS. 12 to 15, the connection end portions 11 and 12 are designed: one is long and the other is short as explained above for connecting adjacent unit coils 7 to each other.

According to the stator 1 in the first embodiment explained above, the distributed winding type multi-phase coil 5 is produced by setting the plurality of unit coils 7 into the plurality of slots 3 of the stator core 4 and connecting the unit coils 7. Herein, the multi-phase coil 5 is composed of different-phase coils, e.g., the U-phase coil, the V-phase coil, and the W-phase coil. The coils of each phase are produced by connecting the unit coils 7 in series with each other. At that time, the first connection end portions 11 of the adjacent unit coils 7 are connected with each other and the second connection end portions 12 of the adjacent unit coils 7 are connected with each other above the stator core 4. Accordingly, unlike the stator using the conventional unit coils, the stator 1 in the present embodiment does not need, in each unit coil 7, to connect the outer-layer coil 8 and the inner-layer coil 9 to constitute one unit coil 7. Consequently, a connecting work for the unit coils 7 to build up the multi-phase coil 5 can be simplified. Since each unit coil 7 can be reduced in the number of connecting portions of the connection end portions 11 and 12, the coil ends of the stator 1 do not take up mush space. As a result, the upper coil end and the lower coil end of the stator 1 can be made equal in height to each other.

According to the stator 1 in the present embodiment, a connecting portion of the first connection end portions 11 of the adjacent unit coils 7 constituting the same phase coil and a connecting portion of the second connection end portions 12 of the adjacent unit coils 7 are located separately in the position close to the inner circumference and the position close to the outer circumference of the stator core 4. Accordingly, a plurality of the connecting portions of the connection end portions 11 and a plurality of the connecting portions of the connection end portions 12 can be arranged respectively at relatively wide intervals between adjacent connecting portions. During the connecting work, the connecting portions are unlikely to interfere with each other, thus enhancing the efficiency in the connecting work.

Furthermore, according to the method of manufacturing the unit coils 7 in the present embodiment, the use of the single continuous flat conductor wire 10 makes it easy to concentrically wind the outer-layer coil 8 and the inner-layer coil 9. Therefore, each unit coil 7 consisting of the outer-layer coil 8 and the inner-layer coil 9 can be easily produced by the single flat conductor wire 10.

Second Embodiment

A second embodiment embodying the method of manufacturing a stator and a unit coil to be used therein according to the invention will be explained below in detail referring to the accompanying drawings.

The following explanation is given with the same reference signs assigned to similar or identical parts to those in the first embodiment and with a focus on different configurations from those in the first embodiment.

Figure 16:
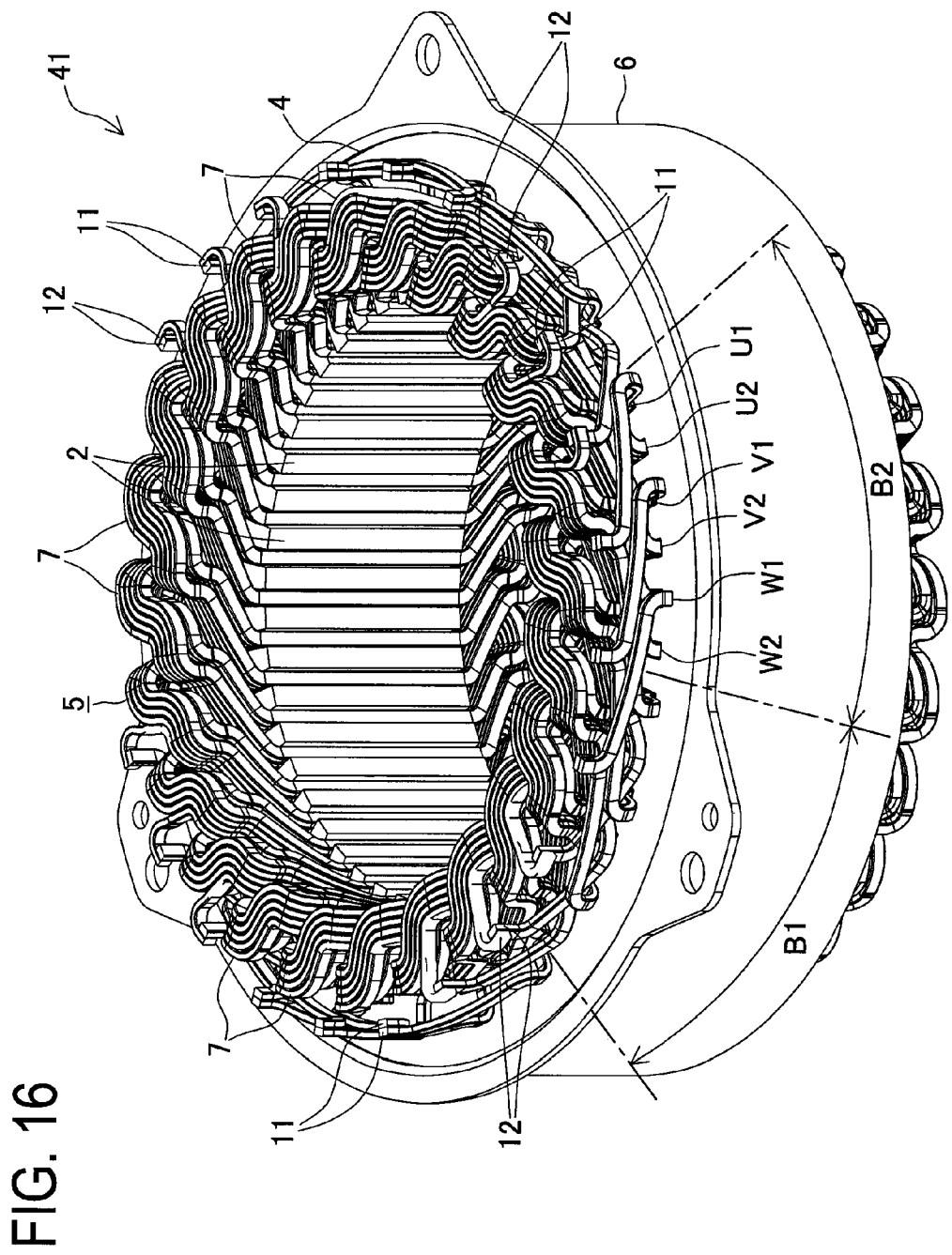
FIG. 16 is a perspective view of a stator in a second embodiment.
Figure 17:
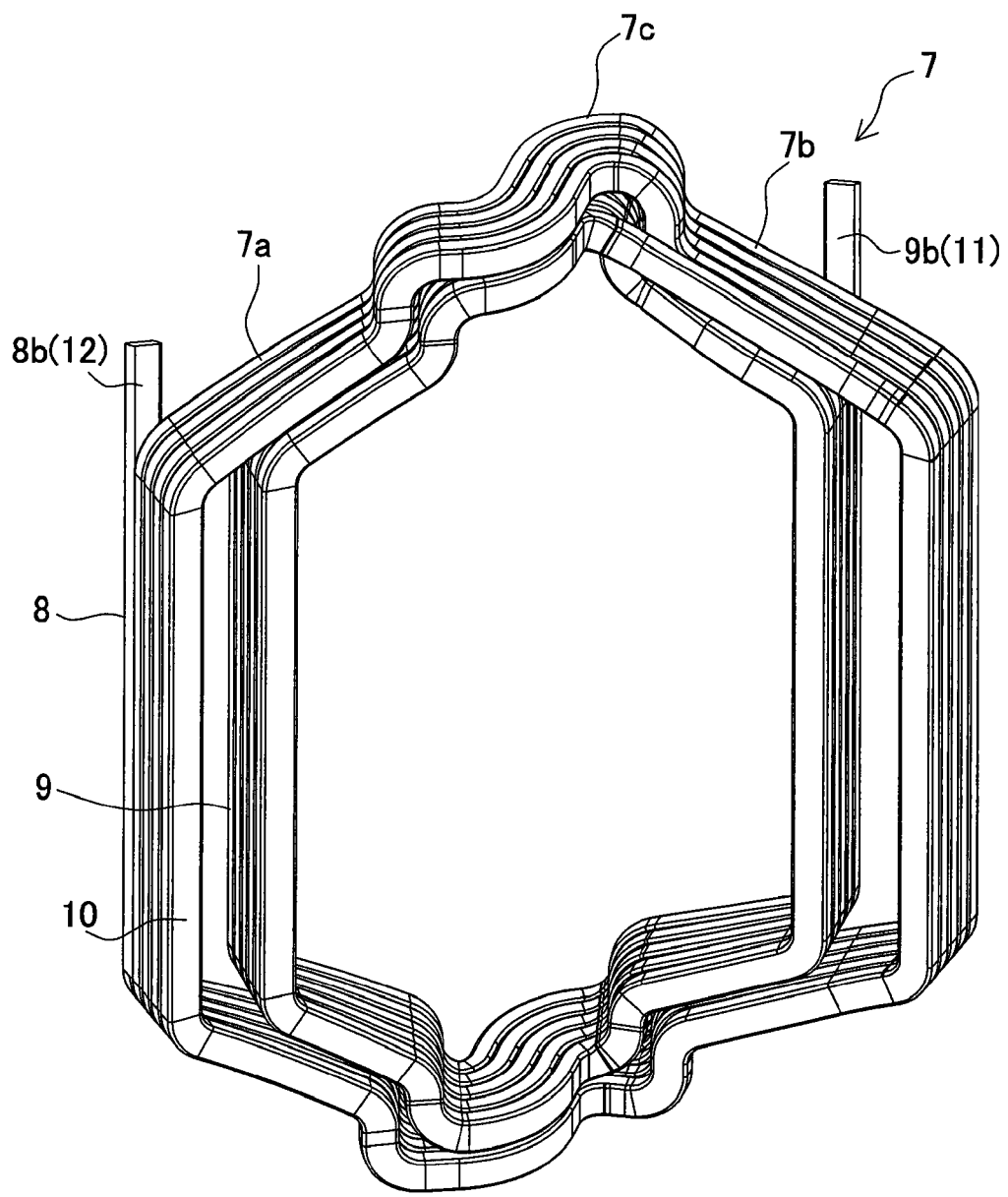
FIG. 17 is a perspective back view of a unit coil in the second embodiment.

FIG. 16 is a perspective view of a stator 41 in this embodiment. FIG. 17 is a perspective back view of one unit coil 7. The stator 41 is different from the stator in the first embodiment in arrangement of connection end portions 11 and 12. Specifically, as shown in FIG. 17, the unit coil 7 in this embodiment is configured such that a winding start portion 9b of an inner-layer coil 9 and a winding end portion 8b of an outer-layer coil 8 form a first connection end portion 11 and a second connection end portion 12 of the unit coil 7. Both the first connection end portion 11 and the second connection end portion 12 are placed in one of two sides or edges of the unit coil 7 in the axial direction thereof, that is, on the edge of the front side.

As shown in FIG. 16, in the stator 41, both the first connection end portion 11 and the second connection end portion 12 of each unit coil 7 are located above an upper end face of the stator core 4 in an axial direction thereof. Further, both the first connection end portion 11 of the inner-layer coil 9 and the second connection end portion 12 of the outer-layer coil 8 are located in positions, on the same side, close to the outer circumference of the stator core 4 above the upper end face thereof. Of the unit coils 7, between the adjacent unit coils 7 constituting the same phase coil (e.g., a "U-phase coil"), the first connection end portions 11 are connected with each other and the second connection end portions 12 are connected with each other.

Figure 18:
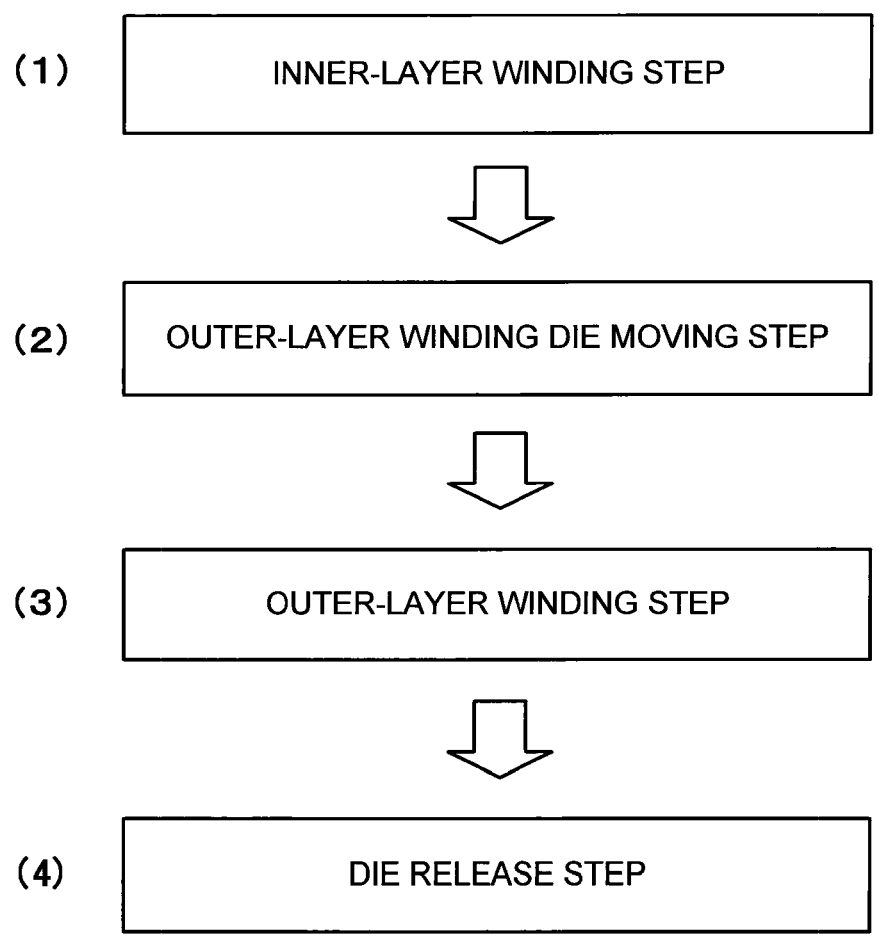
FIG. 18 is a flowchart showing a sequence of steps in a method of manufacturing a unit coil in the second embodiment.

On the other hand, the present embodiment is different from the first embodiment in the method of manufacturing the unit coils 7. The manufacturing method of the second embodiment is explained below. FIG. 18 is a flowchart showing a sequence of steps in the manufacturing method. FIGS. 19 to 22 are cross sectional views schematically showing the steps respectively.

Figure 19:
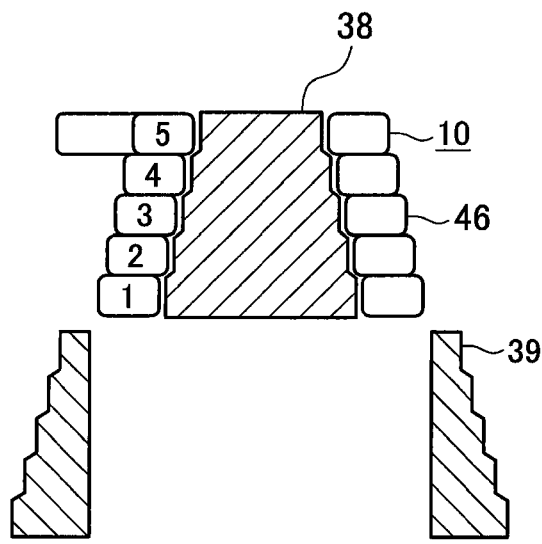
FIG. 19 is a cross sectional view schematically showing an "inner-layer winding step" in the second embodiment.

In an "inner-layer winding step" in (1) of FIG. 18, a flat conductor wire 10 is wound in plural turns on an inner-layer winding die 38 having an almost rectangular columnar shape as shown in FIG. 19. This inner-layer winding die 38 has a stepped surface on an outer periphery formed with steps each having a height conforming to the width of the flat conductor wire 10. In this stage, an outer-layer winding die 39 is placed in a standby condition under the inner-layer winding die 38. The single flat conductor wire 10 is spirally wound on the inner-layer winding die 38 from a lower end toward an upper end to form an inner-layer coil 46. In FIG. 19, each rectangular graphic form indicates the cross section of the flat conductor wire 10 (a hatching is omitted). The numeral labeled in each cross section represents the number of turns. The same applies to other FIGS. 20 to 22.

Figure 20:
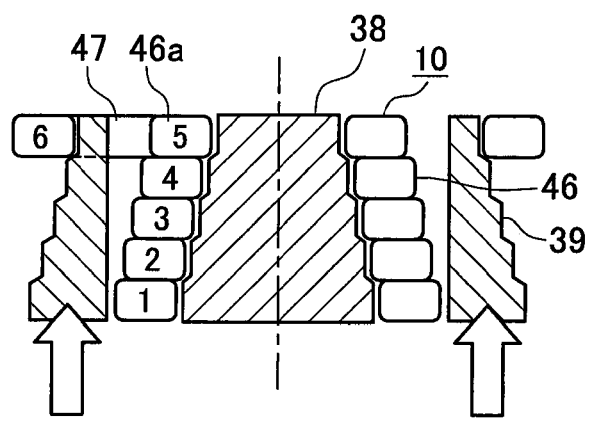
FIG. 20 is a cross sectional view schematically showing an "outer-layer winding die moving step" in the second embodiment.

In an "outer-layer winding die moving step" in (2) of FIG. 18, the outer-layer winding die 39 having an almost rectangular cylindrical shape is moved to the outside (the outer periphery) of the inner-layer coil 46 as shown in FIG. 20. This outer-layer winding die 39 has a stepped surface on an outer periphery formed with steps each having a height conforming to the width of the flat conductor wire 10.

Figure 21:
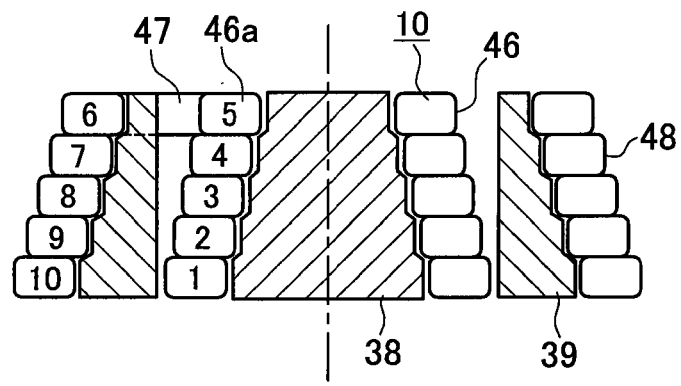
FIG. 21 is a cross sectional view schematically showing an "outer-layer winding step" in the second embodiment.

In an "outer-layer winding step" in (3) of FIG. 18, as shown in FIG. 21, the flat conductor wire 10 is wound in plural turns on the outer periphery of the outer-layer winding die 39 via a bridge portion 47 extending from a winding end portion 46a of the inner-layer coil 46, to form an outer-layer coil 48. At that time, the flat conductor wire 10 is spirally wound on the outer-layer winding die 39 from an upper end toward a lower end thereof, i.e., in an opposite direction to a forward winding direction of the outer-layer coil 46.

Figure 22:
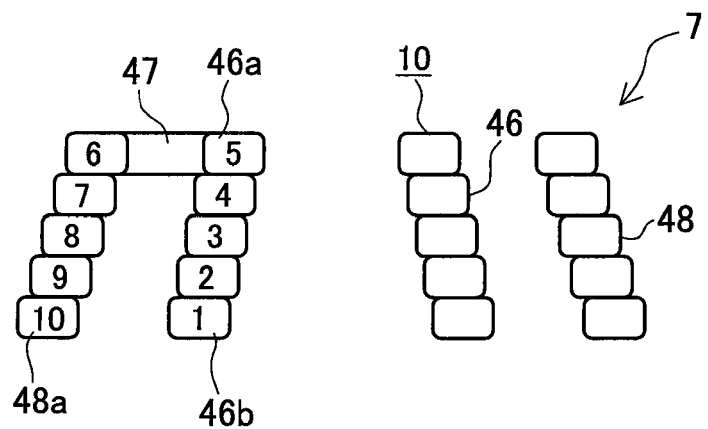
FIG. 22 is a cross sectional view schematically showing a "die release step" in the second embodiment.

In a "die release step" in (4) of FIG. 18, the inner-layer coil 46 and the outer-layer coil 48 are taken out from the inner-layer winding die 38 and the outer-layer winding die 39. Accordingly, as shown in FIG. 22, one unit coil 7 including the inner-layer coil 46 and the outer-layer coil 48 in a concentric winding configuration can be manufactured. In FIG. 22, a winding start portion 46b of the inner-layer coil 46 and a winding end portion 48a of the outer-layer coil 48 are located in one edge or side of the unit coil 7 in the axial direction thereof as indicated by "1" and "10" respectively. Those winding start portion 46b and winding end portion 48a form a pair of connection end portions 11 and 12 of one unit coil 7. Although the details are not illustrated in FIGS. 19 to 22, the connection end portions 11 and 12 are designed so that one is longer and the other is shorter as explained above for connecting the adjacent unit coils 7 to each other.

According to the stator 41 in the present embodiment, as explained above, the distributed winding type multi-phase coil 5 is configured by mounting the unit coils 7 in the slots 3 of the stator core 4 and connecting the unit coils 7. The multi-phase coil 5 consists of different-phase coils. The coils of each phase are produced by connecting the unit coils 7 in series with each other. At that time, the first connection end portions 11 of the adjacent unit coils 7 are connected with each other and the second connection end portions 12 of the adjacent unit coils 7 are connected with each other above the stator core 4. Consequently, unlike the stator using the conventional unit coils, the stator 41 in the second embodiment does not need, in each unit coil 7, to connect the outer-layer coil 8 and the inner-layer coil 9 to constitute one unit coil 7. Consequently, a connecting work for the unit coils 7 to build up the multi-phase coil 5 can be simplified. Since each unit coil 7 can be reduced in the number of connecting portions of the connection end portions 11 and 12, the coil ends of the stator 41 do not take up mush space. As a result, the upper coil end and the lower coil end of the stator 41 can be made equal in height to each other.

According to the stator 41 in the present embodiment, a connecting portion of the first connection end portions 11 of the adjacent unit coils 7 constituting the same phase coil and a connecting portion of the second connection end portions 12 of the adjacent unit coils 7 are both located in the positions on the same side close to the outer circumference of the stator core 4. Accordingly, the space above the upper end face of the stator core 4 can be ensured more interiorly than the multi-phase coil 5. The connecting portion of the first connection end portions 11 and the connecting portion of the second connection end portions 12 are both located in the positions close to the outer circumference of the stator core 4 and on almost the same circumference, thus enhancing the efficiency in the connecting work.

According to the method of manufacturing the unit coils 7 in the present embodiment, the outer-layer coil 8 and the inner-layer coil 9 can be easily obtained by concentrically winding the single continuous flat conductor wire 10. The unit coils 7 each including the outer-layer coil 8 and the inner-layer coil 9 in a concentric winding arrangement can be easily manufactured from the single flat conductor wire 10.

The present invention is not limited to each of the aforementioned embodiments and may be embodied in other specific forms without departing from the essential characteristics thereof.

(1) Each of the aforementioned embodiments adopts the unit coil 7 manufactured by concentrically winding two layer coils, i.e., the outer-layer coil 8 and the inner-layer coil 9. Alternatives may adopt a unit coil manufactured by concentrically winding three layer coils, i.e., an outer-layer coil, an intermediate coil, and an inner-layer coil, or a unit coil manufactured by concentrically winding four layer coils.

(2) The aforementioned first embodiment explains the method of manufacturing the unit coil 7 by concentrically winding two layer coils, i.e., the outer-layer coil 8 and the inner-layer coil 9. This manufacturing method may be applied to a method of manufacturing a unit coil by concentrically winding three layer coils or four layer coils.

(3) In the aforementioned second embodiment, the connecting portion of the first connection end portions 11 and the connecting portion of the second connection end portions 12 are both located in the positions close to the outer circumference of the stator core 4. As an alternative, the connecting portion of the first connection end portions and the connecting portion of the second connection end portions may be both located on the same side close to the inner circumference of the stator core.

INDUSTRIAL APPLICABILITY

The present invention can be used in for example a motor to be mounted in a hybrid electric vehicle, an electric vehicle, and others.

REFERENCE SIGNS LIST

1 Stator
3 Slot
4 Stator core
5 Multi-phase coil
7 Unit coil
7A Unit coil
7B Unit coil
8 Outer-layer coil
8a Winding start portion
8b Winding end portion
9 Inner-layer coil
9a Winding end portion
9b Winding start portion
10 Flat conductor wire
11 First connection end portion
12 Second connection end portion
26 Bridge portion
27 Small coil part
28 Large coil part
31 Winding die
31a Shoulder
31b Small-diameter winding body
31c Large-diameter winding body
38 Inner-layer winding die
39 Outer-layer winding die
41 Stator
46 Inner-layer coil
46a Winding end portion
46b Winding start portion
47 Bridge portion
48 Outer-layer coil
48a Winding end portion

What is claimed is:

1. A stator comprising:
a stator core having a plurality of slots; and
a multi-phase coil of a distributed type provided in the stator core,
the multi-phase coil including a plurality of unit coils, each unit coil being made of a flat conductor wire wound in plural turns, and the unit coils being mounted in the slots of the stator core,
wherein each unit coil includes a plurality of concentrically wound layer coils, each layer coil being made of a single continuous flat conductor wire,
the layer coils of each unit coil include an outermost layer coil and an innermost layer coil, and a winding start portion or a winding end portion of the outermost layer coil and a winding end portion or a winding start portion of the innermost layer coil form a first connection end portion and a second connection end portion of the unit coil,
the first connection end portion and the second connection end portion are located separately at two edges of the unit coil in an axial direction thereof, and
of the unit coils, the first connection end portions of adjacent unit coils constituting the same phase are connected with each other and the second connection end portions of the adjacent unit coils constituting the same phase are connected with each other.

2. The stator according to claim 1, wherein both the first connection end portion and the second connection end portion of each unit coil are located above one end face of the stator core in an axial direction thereof, one of the first connection end portion and the second connection end portion is located in a position close to an inner circumference of the stator core and the other is located in a position close to an outer circumference of the stator core.

3. A stator comprising:
- a stator core having a plurality of slots; and
- a multi-phase coil of a distributed type provided in the stator core,
- the multi-phase coil including a plurality of unit coils, each unit coil being made of a flat conductor wire wound in plural turns, and the unit coils being mounted in the slots of the stator core,
- wherein each unit coil includes a plurality of concentrically wound layer coils, each layer coil being made of a single continuous flat conductor wire,
- the layer coils of each unit coil include an outermost layer coil and an innermost layer coil, and a winding start portion or a winding end portion of the outermost layer coil and a winding end portion or a winding start portion of the innermost layer coil form a first connection end portion and a second connection end portion of the unit coil,
- the first connection end portion and the second connection end portion are both located in one of two edges of the unit coil in an axial direction thereof, and
- of the unit coils, the first connection end portions of adjacent unit coils constituting the same phase are connected with each other and the second connection end portions of the adjacent unit coils constituting the same phase are connected with each other.

4. The stator according to claim 3, wherein both the first connection end portion and the second connection end portion of each unit coil are located above one end face of the stator core in an axial direction thereof, both the first connection end portion and the second connection end portion are located in positions close to an inner circumference or an outer circumference of the stator core.

5. A method of manufacturing a unit coil to be used in the stator set forth in claim 1, the unit coil including a plurality of concentrically wound layer coils, the method comprising:
- a winding step using a winding die of an almost rectangular columnar shape having at least a stepped portion on an outer periphery, the winding die including a plurality of winding bodies that have sequentially different sizes in an axial direction being continuously formed on both sides of the stepped portion, the winding step including winding a single flat conductor wire spirally on an outer periphery of each winding body from one end toward the other end of the winding die and forming a bridge portion extended from the flat conductor wire on the outer periphery of the stepped portion;
- a die release step of taking out the wound flat conductor wire from the winding die; and
- a moving step of relatively moving a small coil part wound on a small winding body of the winding bodies into the inside of a large coil part wound on a large winding body of the winding bodies by plastic-deforming the bridge portion.

6. A method of manufacturing a unit coil to be used in the stator set forth in claim 3, the unit coil including two concentrically wound layer coils, the method comprising:
- an inner-layer winding step of winding a single flat conductor wire spirally on an outer periphery of an inner-layer winding die of an almost rectangular columnar shape, from one end toward the other end, to form an inner-layer coil;
- an outer-layer winding die moving step of moving an outer-layer winding die of an almost rectangular cylindrical shape into the outside of the inner-layer coil;
- an outer-layer winding step of winding the flat conductor wire spirally on an outer periphery of the outer-layer winding die from one end toward the other end in an opposite direction to a forward winding direction of the inner-layer coil, through a bridge portion extended from a winding end portion of the inner-layer coil, to form an outer-layer coil; and
- a die release step of taking out the inner-layer coil and outer-layer coil from the inner-layer winding die and the outer-layer winding die.

* * * * *

UNITED STATES PATENT AND TRADEMARK OFFICE
CERTIFICATE OF CORRECTION

PATENT NO. : 8,587,177 B2  Page 1 of 1
APPLICATION NO. : 13/131245
DATED : November 19, 2013
INVENTOR(S) : Kitamura et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 272 days.

Signed and Sealed this
Twenty-second Day of September, 2015

Michelle K. Lee
*Director of the United States Patent and Trademark Office*